UNITED STATES PATENT OFFICE.

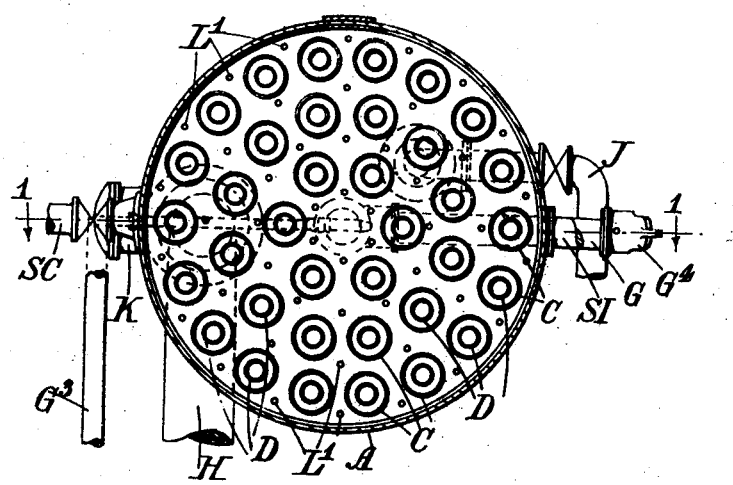
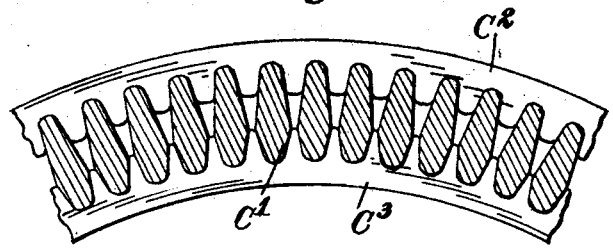
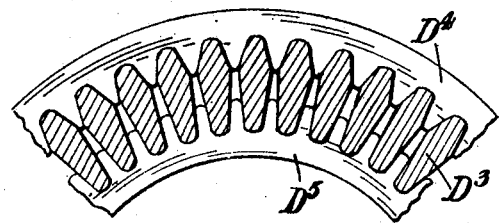

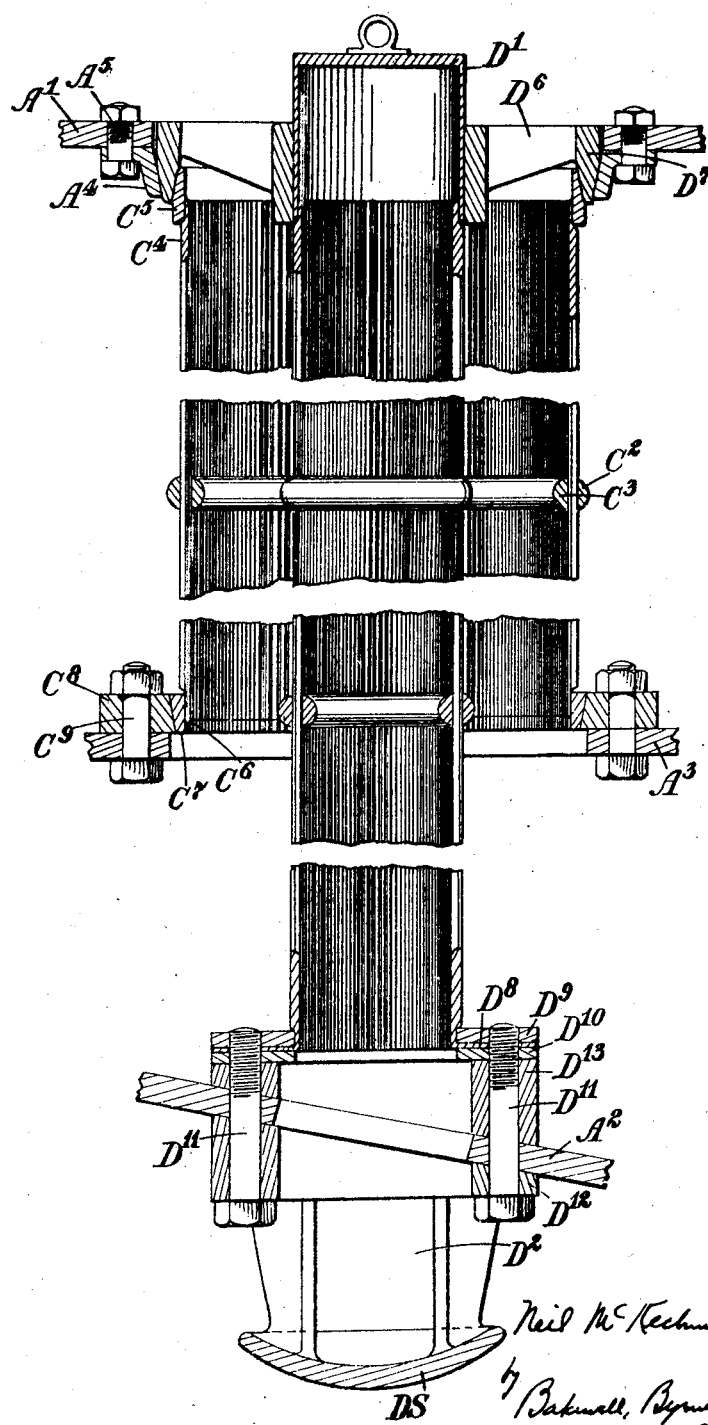

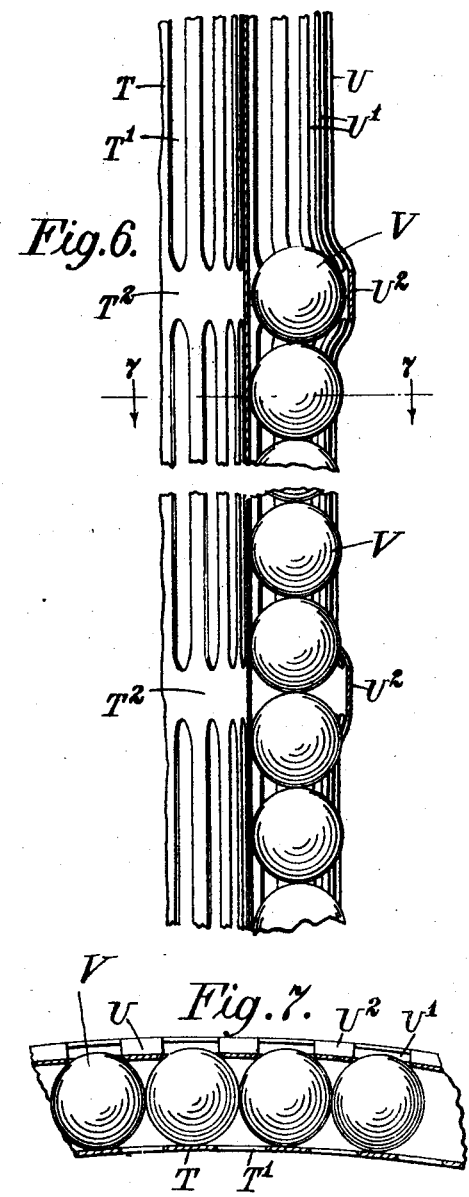

NEIL McKECHNIE BARRON, OF NEW BECKENHAM, ENGLAND.

SAND FILTER.

1,411,201. Specification of Letters Patent. Patented Mar. 28, 1922.

Application filed March 17, 1920. Serial No. 366,652.

*To all whom it may concern:*

Be it known that I, NEIL MCKECHNIE BARRON, a subject of the King of England, residing in New Beckenham, Kent, England, have invented certain new and useful Improvements in Sand Filters, of which the following is a specification.

This invention is for improvements in or relating to sand-filters and has for its object to provide a filter which shall permit of a rate of filtration through the sand surface approximating to that of a slow sand-filter whilst only occupying space approximating to that taken up by a mechanical filter, and shall not be so expensive in operation as the well-known slow sand-filters, nor with such a high rate of filtration and its consequent danger as the mechanical filters, but nevertheless to provide a filter in which the sand shall be as quickly and more efficaciously cleaned than is possible with mechanical filters.

The type of filters to which the present invention relates comprises in combination a sand-chamber, an inlet for unfiltered water at the top of the chamber, sand-excluding outlet-means for filtered water at the bottom, means for admitting sand at the top and an outlet for sand at the bottom whereby the sand can be flushed out and fresh sand run in when entire cleaning is required.

According to the present invention the sand-chamber of the filter contains a plurality of sand-excluding perforated tubes, the lower ends of which tubes extend beyond the bottom of the said chamber or deliver into a chamber shut off therefrom by sand-excluding means, for instance into a second unit containing sand, each tube being surrounded by a larger sand-excluding perforated tube whereof the upper ends are connected together by a sand-distributing plate which partitions off the upper part of the sand-chamber into which the tops of the larger tubes open.

Preferably the bottoms of the larger tubes are carried by a false bottom in the sand-chamber, the said tubes opening into the space beneath the false bottom which space communicates with the sand-outlet.

According to another feature of the invention a sand-filter of the type described, wherein co-axial perforated tubes are employed with a sand-layer disposed between them for filtering the water, is characterized by means for spraying water under pressure on to the outer surfaces of the outer tubes aforesaid for the purpose of cleansing those surfaces.

A further feature of the invention comprises a construction in which the filter is composed of superimposed units each with upper and lower conduits for changing the sand, sand-excluding means for passing the filtered water from the upper unit to the lower unit, and means for delivering filtered water from the lower unit to the discharging conduit, the two units thus constituting a single filter so arranged that when the sand in one unit is being changed that in the other unit may remain undisturbed.

The invention also includes other features, such as particular constructions of perforated tubes; the manner in which parts of the tubes are assembled, and means for securing the tubes in situ, and these and other features of the invention will be more clearly understood from the following description taken in connection with the accompanying drawings in which—

Figure 2 is a section on the line 2—2 of Figure 1;

Figure 3 is a central sectional elevation on an enlarged scale of a pair of perforated tubes;

Figures 4 and 5 are sectional views on a still further enlarged scale of details of the construction of the filter-tube shown in the preceding figures;

Figure 6 is a part central sectional elevation of a modified construction of filter-tube on an enlarged scale, and Figure 7 is a section on the line 7—7 of Figure 6.

Like letters indicate like parts in the accompanying drawings.

Figure 1:
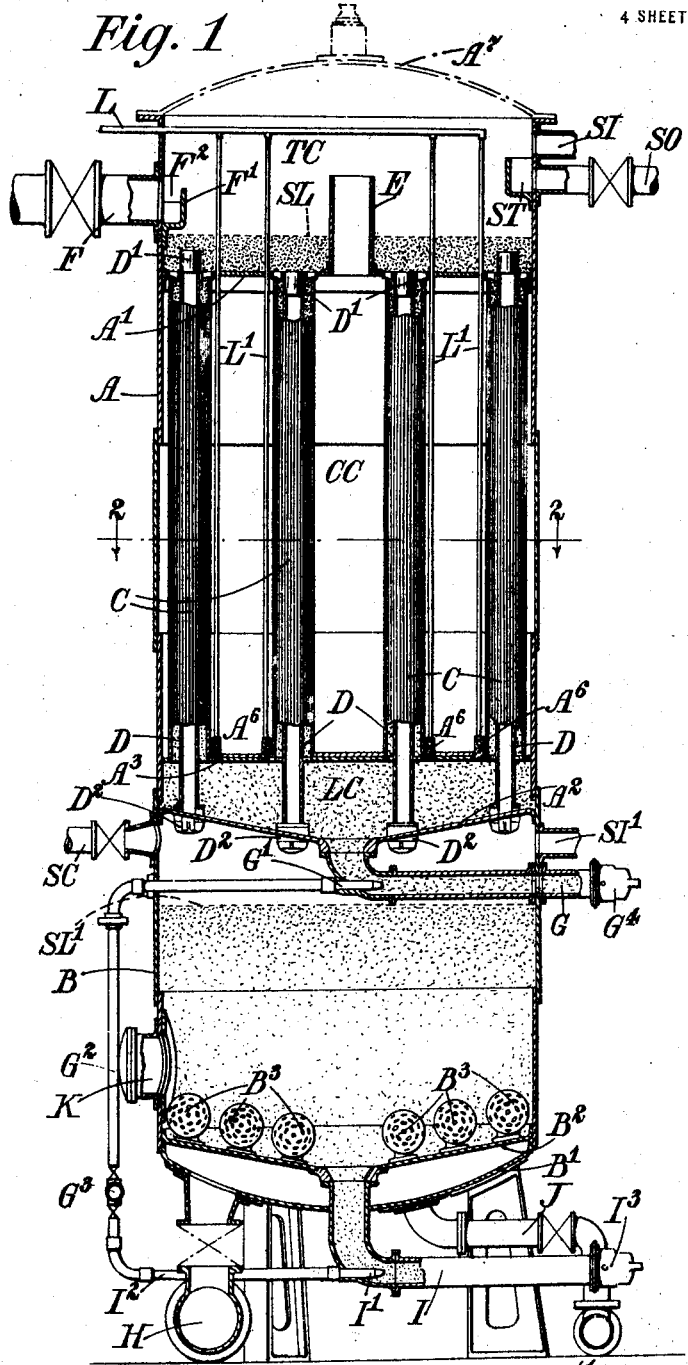
Figure 1 is a central sectional elevation of one preferred embodiment of a filtering device comprising two superimposed units.

In Figure 1, the general arrangement of parts in the preferred construction is illustrated, and only those filter-tubes whose axes fall on the centre line 1—1 of Figure 2 are illustrated, the other tubes having been omitted for the sake of clearness.

The filter illustrated comprises two superimposed chambers designated generally by the reference letters A and B. They are shown as constructed of cylindrical form, and each is built up of several annuli of suitable material welded or otherwise connected to produce the cylindrical chambers required. The upper chamber is provided with a top sand-distributing plate $A^1$, a bottom-plate $A^2$ and an auxiliary or false bottom-plate $A^3$. The bottom plate $A^2$ constitutes a top plate for the chamber B, which is in its turn provided with a bottom-plate $B^1$, and an auxiliary or false bottom-plate $B^2$.

In the upper chamber A are a number of perforated filter elements each comprising an outer tube C and an inner tube D, the construction of both of which is similar and will be described in detail hereinafter.

The outer tubes C are secured to and open through the plates $A^1$ and $A^3$ respectively, so that a free passage is afforded between the chamber above the top plate $A^1$, hereinafter referred to as the chamber TC, and the chamber below the bottom plate $A^3$, hereinafter referred to as the chamber LC, through the space between the outer tube C and inner tube D. Each of the latter tubes D is closed at its upper end by a cap $D^1$, but its lower end communicates with an orifice in the plate $A^2$ and is provided at $D^2$ with a water-deflecting device to prevent the water, issuing from the tubes D, from disturbing the surface of the sand bed in the part B. Such a device is shown in Figure 3 as provided with a deflecting surface DS on to which water from the tube D will be discharged and spread over the bottom sand bed.

Perforated nozzles $A^6$ secured to the plate $A^3$ communicate between the chambers CC and LC and are provided for the purpose of preventing air-lock when the sand is being run in as hereinafter described.

The inter-tubular portions of the plates $A^1$ and $A^3$ (with the exception, in the latter case, of the nozzles $A^6$) are solid, so that the only communication between the chambers TC and LC is through the passages between the tubes C and D, as previously stated.

Centrally of the plate $A^1$ is a conduit E providing open communication between the chamber TC and the central portion CC, located between the plates $A^1$ and $A^3$.

Leading into the upper end of the upper chamber is a valve-controlled inlet conduit F (for unfiltered water) delivering into a deflecting chamber $F^1$ which is within the chamber and has one side $F^2$ lower than the other sides for the outlet of the unfiltered water into the chamber TC. Thus the incoming water is deflected so as to discharge above the sand bed more or less circumferentially thereby preventing disturbance of the surface of the sand bed.

There is also a sand-inlet conduit SI and a valve-controlled outlet SO for water employed in scouring the sand in the chamber A. The scour water passes as shown into a "trap" ST before it can be admitted to the conduit SO, the trap ST preventing the water from carrying sand away with it.

The bottom plate $A^2$ is of inverted conical formation, and at its lowest point terminates in a conduit G for the discharge of the sand from the upper chamber when it is desired to remove it and replace it with clean sand. In the conduit G is an ejector-nozzle $G^1$ communicating with a conduit $G^2$ supplied through a conduit $G^3$ with water under high pressure. The extremity of the conduit G, where it projects through the side of the chamber B, is closed by a cap $G^4$ provided with a two-way cock which in one position completely closes the outlet G, but in its other position admits the passage of water through the cock without, however, permitting the passage of sand.

The lower chamber B is provided with a valve-controlled outlet-conduit H for filtered water; a sand-outlet conduit I opening in the bottom plate $B^2$ and having in it an ejector-nozzle $I^1$ similarly constructed and for the same purpose that the conduit G and nozzle $G^1$ are provided for the upper chamber. The nozzle I is supplied with water under pressure through a conduit $I^2$, which also receives its supply of water through the conduit $G^3$, and a cap $I^3$ is provided with a cock similar to that described in connection with the cap $G^4$; a valve-controlled outlet J opening through the bottom plate $B^1$ for removal of waste water; a sand-inlet $SI^1$ and a man-hole K. Sand-excluding devices $B^3$ are provided in the lower chamber B for the purpose of permitting the passage of water through orifices in the plate $B^2$ which orifices are controlled by the devices $B^3$. The filtered water thereby escapes through the devices $B^3$ and plate $B^2$ to the outlet-conduit H.

There is also provided a valve-controlled conduit SC for the admission of filtered water under pressure for scouring the sand in the upper chamber A.

In one form illustrated in detail in Figures 3, 4 and 5, the tubes C and D are each composed of a number of vertical wires spaced apart by spacing-devices.

Figure 4 shows, in section, a portion of the outer tube in which wires $C^1$ of "coffin"-shaped cross-section are held by one or more pairs of spacing-rings disposed at intervals in their length, these rings being shown at $C^2$ and $C^3$ with their opposing surfaces formed with teeth engaging between the wires $C^1$ and secured thereto, preferably by welding. The thickness of the upper ends of the wires $C^1$ is preferably reduced as at $C^4$ and these ends are welded to a ring $C^5$ having its upper edge of wedge-shaped cross-section. The lower ends of the wires at $C^6$ are similarly reduced in thickness and are welded or otherwise secured to a ring $C^7$, also of wedge-shaped cross-section.

The inner tubes D are similarly composed of wires of "coffin"-shaped cross-section $D^3$, held between toothed rings $D^4$ and $D^5$. The wires $D^3$ are reduced in thickness at their upper ends and are welded to the cap $D^1$ as shown, and over the latter the central boss of a spider $D^6$ makes an easy sliding fit. The spider supports at the outer ends of its arms a ring $D^7$ of such a section as to co-operate in a wedging action between the ring $C^5$ and a ring $A^4$ secured by means of a bolt $A^5$ to the sand-distributing plate $A^1$. The lower ends of the wires D are reduced in thickness and bent round at right-angles as at $D^8$ so as to be gripped between and welded to rings $D^9$ and $D^{10}$. The water-deflecting device $D^2$ is held to the lower ends of the tubes by means of bolts $D^{11}$ which pass through the bottom plate $A^2$ and tubular spacing-pieces $D^{12}$ and $D^{13}$, finally to engage with the compound end $D^8$, $D^9$, $D^{10}$. The construction is such that the parts $D^8$, $D^9$, $D^{10}$, $D^{12}$, $D^{13}$ and the plate $A^2$ are held together so as to form a continuous tubular connection with the lower end of the inner tube D.

It will be seen, therefore, that in each pair of tubes C and D, the inner tube is held between the lower plate $A^2$ and the central boss of the spider $D^6$ and at the same time the ring $D^7$ carried by the spider $D^6$ positions and retains the upper end of the outer tube C as shown. The lower end-ring $C^7$ of the outer tube C is received by a socket $C^8$ secured by bolts $C^9$ to the plate $A^3$. The wedging ring $D^7$ is driven home into position by the application of a requisite force or by blows delivered on to its upper end.

The wires $C^1$ and $D^3$ are spaced apart sufficiently to allow water to percolate between them, without however permitting the passage of sand, and it is found that wires of "coffin"-section such as those illustrated are particularly suitable for this purpose. It will be noted, however, that the position of closest proximity between a pair of adjacent wires in the outer tube C is nearer the inner surface of the tube, but that this position is reversed in connection with the inner tubes D, that is to say it is nearer the outer surface of the tubes. As each pair of tubes is of similar construction, the foregoing description applies to all the pairs of tubes C and D employed in the filter.

Communicating with a conduit L are a number of conduits $L^1$ arranged close to and parallel with the outer tubes C and perforated at intervals throughout their length. The lower ends of these conduits are closed and rest on the nozzles $A^6$. Water under pressure can be supplied through the conduits $L^1$ to spray against the outer surfaces of the tubes C for the purpose of cleansing them.

When using the apparatus as a pressure filter, a top cover $A^7$ is conveniently provided securely held in position by any suitable means.

The operation of the filter so far described is as follows:—

When filling the upper unit A with sand the cock in the cap $G^4$ is operated to permit the passage of water therethrough without the passage of sand as hereinbefore described. Sand is then run in with water through the sand-inlet SI and spreads over the distributing-plate $A^1$ whence it runs down through the spaces between the tubes C and D into the chamber LC. The latter chamber and the conduit G becomes completely filled (the nozzles $A^6$ preventing any air-lock) as are also the spaces between the tubes C and D. Sand and water are continued to be run in until the sand above the plate $A^1$ has attained sufficient depth and is approximately at the level indicated by the dotted line SL in the drawings. During the filling in of the sand and water, some of the water passes out through the cock in the cap $G^4$ and some passes through the sand in the space between the tubes C and D into the inner tubes and escapes by them into the chamber B. When a layer of sand of the required thickness has been deposited above the plate $A^1$ the supply of sand and water is cut off and the cock in the cap $G^4$ is turned to the closed position to prevent further escape of water.

The bottom unit B is similarly filled by running in sand and water through the inlet $SI^1$ until sufficient sand has been deposited to a level substantially to that shown at $SL^1$ in the drawings just beneath the outlet conduit G. The water which is run in with the sand escapes through the sand-excluding outlets $B^3$ and through the conduit J and the cock in the cap $I^3$. When the required amount of sand has been run in, the cock in the cap $I^3$ is closed to prevent any further escape of water through the conduit I. In the manner just described the filling of the two portions of the filter can be effected with considerable rapidity.

The filter unit is now ready for filtering, say, water. All the conduits are closed with the exception of the conduits F and H and unfiltered water is run in through the conduit F. The bulk of the water rises in the chamber TC and overflows through the conduit E into the chamber CC; thence it passes through the tubes C, through the layer of sand between them and the tubes D and finally into the interior of the tubes D and through the outlets $D^2$ into the chamber B. A portion of the water flows directly through the sand bed on the plate $A^1$ into the space between the tubes C and D and thence to the chamber B, and a further portion flows through the perforated nozzles A⁶ through the sand in LC and the lower ends of the tubes D to chamber B. All the water from the chamber A percolates through the sand bed in the bottom chamber B and filtered water escapes through the sand-excluding devices B³ to the filtered water outlet H.

Except when first charging the filter new sand is never supplied simultaneously to both units. This is an important feature as it prevents accident from a too free passage of the water when the sand is clean. Thus, if the sand in the upper unit is to be changed, that in the lower unit has become provided with a skin and is not disturbed, so that even though the water may for a time pass somewhat freely through the first unit, it meets with resistance through the skin and partially clogged sand of the second unit, and by the time the sand in the second unit requires cleaning a skin has been formed in the first unit.

To change the sand in either unit, the filtered water outlet H is shut off and the cap G⁴ or I³ is removed. The whole of the sand can be then run out through the conduit G or I aided by the admission of water under pressure through the ejector-nozzle G¹ or I¹ respectively. Refilling with sand and water can then be effected in the manner described above.

If it is only required to remove the skin which has formed on the surface of the sand in the upper unit without removing the sand from the filter, the unfiltered water supply is shut off and the scour outlet SO is opened. Filtered water under pressure is admitted through the conduit SC and travels up the inner tubes D and outwards through the sand and the outer tubes C, carrying with it the clogged material forming the skin. The scouring water passes out from the chamber A through the valve-controlled scour-outlet SO and as soon as sufficient scouring has been effected the filtered water is shut off and filtering proceeds as before.

Water under pressure can also be sprayed through the conduits L¹ to cleanse the interstices of the tubes C. It is not usually desirable to scour the sand in this manner in the lower unit, the lower waste-pipe J being only intended for releasing the water which may have collected between the plates B¹ and B² when filling the chamber with sand, or to run the first filtered water to waste— if desired—when the filter is started in the first instance or restarted after scouring. If, however, it should be desirable that the sand in the bottom chamber be capable of being scoured, a scour-outlet, and an inlet for filtered water would be provided for the chamber B similar to the conduits SC and SO provided for the chamber A.

Figures 6 and 7 illustrate a modified form in which perforated tubes, such as C or D, can be constructed. Each of such tubes is constituted by two co-axial tubes T, U, formed with a plurality of slots T¹ and U¹ respectively extending in an axial direction and spaced apart circumferentially leaving solid interslot portions. The slots preferably do not extend over the major axial length of the tubes, but are in lengths separated by solid annular portions T² and U² respectively for strengthening purposes. These solid portions are "swelled" out on either or both the tubes T and U to give clearance for the filling bodies (hereinafter described) to pass down. In the drawing the solid portions of the tube U are shown as "swelled" out only.

When the tubes T and U are assembled the slots T¹ and U¹ respectively are not in radial alignment but the tubes are so arranged that in a radial direction a slot T¹ is opposed by a solid interslot portion of the tube U and vice versa. Between the tubes T and U are disposed rows of small bodies V, preferably of spherical form, which may be composed of stone, porcelain, metal or glass for example. These bodies are vertically one above another in each row and are retained in this relationship by either the slots T¹ or U¹. In the illustration, portions of the bodies V are shown as projecting through the slots U¹ which serve to guide them and at the opposite end of their diameters these bodies are guided against the solid interslot portions of the tube T. The interstices between the bodies V serve to permit the passage through them of water but not of sand, the latter being retained between the inner pair of tubes and an outer pair of tubes such as T and U in a similar manner to that in which it is retained between the tubes C and D previously described.

It will be appreciated that the perforated tubes employed in the filter-units may be of other constructions than those described in the foregoing specification, and it will also be appreciated that the specific embodiments described are by way of illustration only and not by way of limitation.

The strips such as C¹ or D³, instead of being spaced apart by means of co-operating toothed rings as described, could be spaced apart by suitably slotted or perforated annular plates.

It is also within the present invention to employ a filter comprising a unit such as the top chamber A with its attendant parts.

What I claim as my invention and desire to secure by Letters Patent is:—

1. A sand-filter comprising, in combination, a sand-chamber, an inlet for sand and an inlet for unfiltered water at the top of said chamber, a sand-distributing plate serving to partition off the upper part of the sand-chamber, a plurality of sand-excluding perforated tubes within said chamber the lower ends of which tubes deliver beyond the bottom of said chamber through sand-excluding means, a larger sand-excluding perforated tube surrounding each of said first named tubes, said larger tubes being connected together at their upper ends by the sand-distributing plate and opening into the upper portion of the sand-chamber above said partition, and an outlet for sand at the bottom of said sand-chamber, substantially as described.

2. A sand-filter comprising, in combination, a sand-chamber, an inlet for sand and an inlet for unfiltered water at the top of said chamber, a sand-distributing plate serving to partition off the upper part of the sand-chamber, a false bottom in the sand-chamber, a plurality of sand-excluding perforated tubes within said chamber which tubes deliver beyond the bottom of said chamber through sand-excluding means, a larger sand-excluding perforated tube surrounding each of the first named tubes, said larger tubes being supported at their ends respectively in the said sand-distributing plate and false bottom, the two ends opening respectively into the upper part of the sand-chamber above said sand-distributing plate and into the space beneath the false bottom, and a sand-outlet communicating with the space beneath the said false bottom, substantially as described.

3. A sand-filter comprising, in combination, a sand-chamber, an inlet for sand and an inlet for unfiltered water at the top of said chamber, a plurality of filter-tubes within said chamber, each comprising a pair of coaxial perforated tubes with a sand-layer disposed between them for filtering the water, means for spraying water under pressure onto the outer surfaces of the outer tubes aforesaid for the purpose of cleansing those surfaces, sand-excluding outlet means for filtered water at the bottom of said chamber, and an outlet for sand at the bottom of said chamber whereby the sand can be flushed out for cleaning purposes, substantially as described.

4. A sand-filter comprising, in combination, a sand-chamber, an inlet and an outlet for sand at the top and bottom respectively of said chamber, an inlet for unfiltered water at the top of said chamber, a sand distributing plate serving to partition off the upper part of the sand chamber, a plurality of sand-excluding perforated tubes within said chamber, the lower ends of which tubes deliver beyond the bottom of said chamber through sand-excluding means, a larger sand-excluding perforated tube surrounding each of said first named tubes, said larger tubes being connected together at their upper ends by the sand-distributing plate and opening into the upper portion of the sand chamber above said partition, and a water-admission conduit (for unfiltered water) communicating between the chamber containing the larger tubes and the space above a sand layer on the top of the sand-distributing plate aforesaid, whereby unfiltered water is caused to overflow from the top sand bed and through the said conduit into the chamber containing the larger tubes, substantially as described.

5. A sand-filter comprising, in combination, a sand-chamber, an inlet and an outlet for sand at the top and bottom respectively of said chamber, an inlet for unfiltered water at the top of said chamber, a sand-distributing plate serving to partition off the upper part of the sand chamber, a plurality of sand-excluding perforated tubes within said chamber, the lower ends of which tubes deliver beyond the bottom of said chamber through sand-excluding means, a larger sand-excluding perforated tube surrounding each of said first named tubes, said larger tubes being connected together at their upper ends by the sand-distributing plate and opening into the upper portion of the sand-chamber above said partition, and both the inner and outer perforated tubes being composed of vertical strips maintained in their proper circumferentially spaced relationship by means of a spacing device for the strips constituting each tube, substantially as described.

6. In a sand-filter having a sand chamber, inlet and outlet conduits for sand at the top and bottom respectively of said chamber, an inlet for unfiltered water at the top of said chamber, and at the bottom thereof, a sand-excluding outlet for filtered water, the combination of a plurality of filter elements within the sand chamber, each element comprising two coaxial sand-excluding perforated tubes with a sand layer between them, each tube being constituted by a series of vertical strips and a spacing device for retaining the strips of each tube in their proper circumferentially spaced relationship, substantially as described.

7. In a sand-filter having a sand-chamber, inlet and outlet conduits for sand at the top and botton respectively of said chamber, an inlet for unfiltered water at the top of said chamber, and at the bottom thereof, a sand-excluding outlet for filtered water, the combination of a plurality of filter elements within the sand chamber, each element comprising two coaxial sand-excluding perforated tubes with a sand layer between them, each tube being constituted by a series of vertical strips of "coffin"-shaped section and a perforated annular plate for retaining the strips in their proper circumferentially spaced relationship, substantially as described.

8. A sand-filter comprising, in combination, a sand-chamber, an inlet and an outlet for sand at the top and bottom respectively of said chamber, an inlet for unfiltered water at the top of said chamber, a sand distributing plate serving to partition off the upper part of the sand chamber, a plurality of sand-excluding perforated tubes within said chamber, the lower ends of which tubes deliver beyond the bottom of said chamber through sand-excluding means, a larger sand-excluding perforated tube surrounding each of said first named tubes, said larger tubes being connected together at their upper ends by the sand-distributing plate and opening into the upper portion of the sand chamber above said partition, and a spider for each pair of tubes, operatively connected to the upper end of the inner tube and having an outer peripheral annular rib, the lower edge of which is wedge-shaped and adapted frictionally to engage between a cooperating wedge surface on the upper end of the outer tube, and the sand-distributing plate aforesaid, substantially as described.

9. A sand-filter comprising, in combination, a sand-chamber, an inlet for sand and an inlet for unfiltered water at the top of said chamber, a sand-distributing plate serving to partition off the upper part of the sand-chamber, a false bottom in the sand-chamber, a plurality of sand-excluding perforated tubes within said chamber which tubes deliver beyond the bottom of said chamber through sand-excluding means, a larger sand-excluding perforated tube surrounding each of the first-named tubes, said larger tubes being supported at their ends respectively in the said sand-distributing plate and false bottom, the two ends opening respectively into the upper part of the sand-chamber above said sand-distributing plate and into the space beneath the false bottom, a sand outlet communicating with the space beneath said false bottom, a spider for each pair of tubes, operatively connected to the upper end of the inner tube and having an outer peripheral annular rib, the lower edge of which is wedge-shaped and adapted frictionally to engage between a cooperating wedge surface on the upper end of the outer tube, and the sand distributing plate aforesaid, a retaining ring engaging the lower edge of the outer tube, the engaging surfaces between the ring and the tube end being wedge shaped, and means to secure the ring to the aforesaid false bottom of the sand-chamber, substantially as described.

10. In a sand-filter having a sand-chamber, an inlet for unfiltered water at the top of said chamber, sand-excluding outlet means for filtered water at the bottom, and inlet and outlet sand changing conduits at the top and bottom respectively of the sand-chamber, the combination of two superimposed filter units each with upper and lower sand-changing conduits, and having the sand-excluding outlet means aforesaid at the bottom of the upper unit in communication with the top of the lower unit, and means for delivering filtered water from the lower unit to the discharging conduit, the said two units thus constituting a single filter so arranged that when the sand in one unit is being changed that in the other may remain undisturbed, substantially as described.

11. A sand-filter comprising, in combination, two superimposed sand chambers, a plurality of filter elements within one, at least, of said chambers, each element aforesaid comprising two coaxial perforated tubes with a sand layer disposed between them, an inlet for unfiltered water at the top of the upper chamber, inlet and outlet sand changing conduits in each chamber, sand-excluding outlet means at the bottom of the upper chamber in communication with the top of the lower chamber, and sand-excluding outlet means for delivering filtered water from the lower chamber, substantially as described.

In testimony whereof I affix my signature.

NEIL McKECHNIE BARRON.